C. A. SPRAGUE & J. W. CLARDY.
Cotton Chopper and Rake.

No. 210,574. Patented Dec. 3, 1878.

WITNESSES:
W. W. Hollingsworth
Amos W. Hart

INVENTOR:
C. A. Sprague
J. W. Clardy
BY
ATTORNEYS.

UNITED STATES PATENT OFFICE.

CHAUNCEY A. SPRAGUE AND JOHN W. CLARDY, OF WEAVER'S STATION, ALABAMA.

IMPROVEMENT IN COTTON CHOPPER AND RAKE.

Specification forming part of Letters Patent No. 210,574, dated December 3, 1878; application filed October 30, 1878.

*To all whom it may concern:*

Be it known that we, CHAUNCEY A. SPRAGUE and JOHN W. CLARDY, of Weaver's Station, in the county of Calhoun and State of Alabama, have invented a new and Improved Cotton Chopper and Rake; and we do hereby declare that the following is a full, clear, and exact description of the same.

The invention is an improvement in the class of cotton-cultivating machines in which a vibrating hoe is employed to thin out the plants.

The invention consists in the construction and arrangement of parts, as hereinafter described and claimed.

Figure 1:
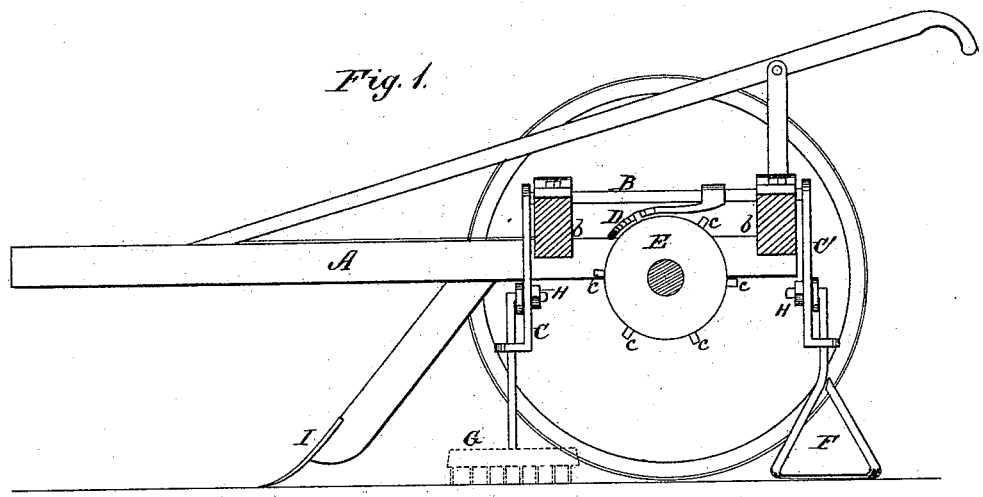
Figure 2:
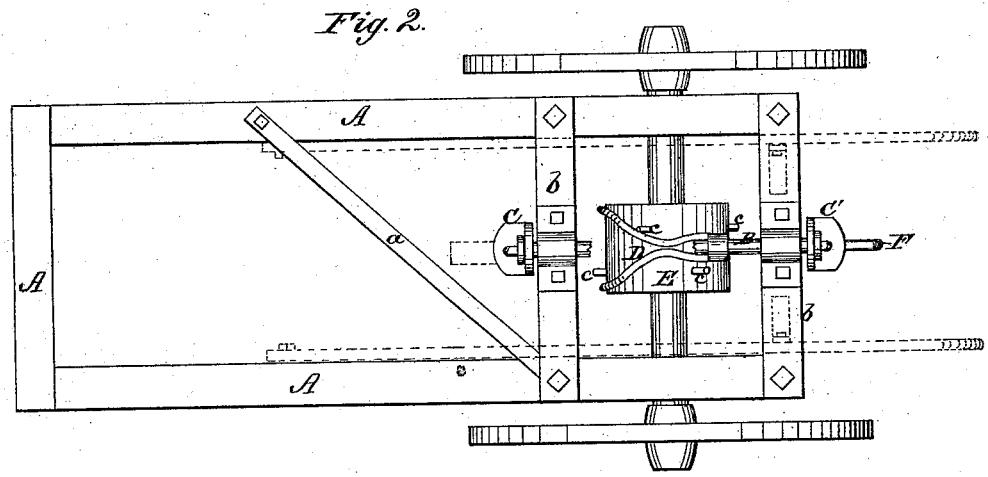
Figure 3:
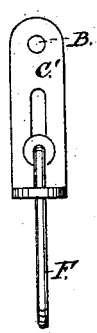

Figure 1 is a longitudinal section, and Fig. 2 a plan view, of our improved machine. Fig. 3 is a plan view of one of the slotted cranks or arms to which the chopper is attached.

The frame A of the machine is oblong and rectangular in form, and provided with a diagonal brace, $a$, and parallel transverse bars $b\ b$. The rock-shaft B has its bearings in bars $b\ b$, and from its ends are pendent slotted cranks or arms C C', which carry a hoe or rake, or both, according to the kind of cultivation the cotton-plants require. The shaft B is rocked by contact of its forked arm D with pins $c$, set in the periphery of the wheel or enlargement E of the transporting-axle. The pins are set in two separated circumferential rows or series, each pin in either row being placed opposite a vacant space in the other row, in order to produce the required alternation of contact with the lever D.

The shanks of the hoe F and rake G pass through eyes in the lower ends of the respective front and rear cranks, C C', and are bent and screw-threaded at their upper ends, to adapt them to pass through the slots in the cranks and receive clamp-nuts H, by which they are secured at different heights or adjustments, as required by the height of the plants, or the ridges in which they grow.

The standards of the shovels or furrow-openers I are attached to the side beams of frame A at points about midway of their length.

In practical operation, the machine straddles a row of cotton-plants, and as it advances the shovels or plows I open a shallow furrow on each side. The rake G being attached to the front crank, C, and being vibrated by action of the cam-wheel pins $c$ on the arm D of the rock-shaft B, the rake will clean the ground around and between the plants and break up and loosen the crust. The rake is preferably used for the first cultivation of the cotton, and after it has been planted a few days, and after it is well up, the rake is used again in the same manner.

The hoe F is used a few days after passing over with the rake, for the purpose of blocking out the plants. We may in some instances employ both hoe and rake together instead of separately. The plows may also be dispensed with in some cases, and the rake and hoe used alone.

We do not claim, broadly, operating a cotton-chopper hoe by means of a rock-shaft to which oscillation is imparted by a cam-grooved rotating cylinder; but

What we claim is—

In a cotton-chopper, the combination of the roller having the two sets or series of pins, $c\ c$, alternating in position, as specified, and arm D, having its free end forked, as shown, the rock-shaft B, a vertically-slotted crank-arm, the bent hoe-shank, and the nut and washer for clamping the same in any adjustment on said arm, as set forth.

CHAUNCEY A. SPRAGUE.
J. W. CLARDY.

Witnesses:
H. SNOW,
LYMAN CLARDY.